United States Patent
Hoben et al.

(10) Patent No.: US 7,470,060 B1
(45) Date of Patent: Dec. 30, 2008

(54) DETECTION APPARATUS FOR MEASURING FLUID IN A VESSEL

(75) Inventors: John Charles Hoben, Sugar Land, TX (US); Allen Ray Westmoreland, Sugar Land, TX (US); Alexander Bukhman, Houston, TX (US); Israel Bukhman, Houston, TX (US)

(73) Assignee: Innovative Measurement Methods, Inc., Sugar Land, TX (US)

( * ) Notice: Subject to any disclaimer, the term of this patent is extended or adjusted under 35 U.S.C. 154(b) by 0 days.

(21) Appl. No.: 11/871,827

(22) Filed: Oct. 12, 2007

Related U.S. Application Data

(63) Continuation-in-part of application No. 11/473,859, filed on Jun. 23, 2006, now Pat. No. 7,284,428.

(51) Int. Cl.
| | |
|---|---|
| *G01K 1/14* | (2006.01) |
| *G01K 13/00* | (2006.01) |
| *G01K 7/00* | (2006.01) |
| *G08C 19/00* | (2006.01) |
| *G01L 7/00* | (2006.01) |
| *G01L 9/00* | (2006.01) |
| *G01F 23/00* | (2006.01) |

(52) U.S. Cl. ............ 374/143; 374/110; 374/166; 340/870.16; 340/870.17; 702/130; 702/137; 702/138; 73/714; 73/295; 73/149; 73/223

(58) Field of Classification Search ............ 374/143, 374/166, 110; 340/870.17, 870.16; 702/130, 702/138, 137; 73/714, 295, 149, 223
See application file for complete search history.

(56) References Cited

U.S. PATENT DOCUMENTS

| | | | | |
|---|---|---|---|---|
| 2,753,713 A | * | 7/1956 | Mabey | 374/115 |
| 4,523,460 A | * | 6/1985 | Strickler et al. | 73/200 |
| 4,593,561 A | * | 6/1986 | Gavrilovic | 73/170.29 |
| 4,699,519 A | * | 10/1987 | Persson | 374/111 |
| 4,852,054 A | * | 7/1989 | Mastandrea | 702/51 |
| 4,915,507 A | * | 4/1990 | Janotta | 374/115 |
| 4,916,643 A | * | 4/1990 | Ziegler et al. | 702/188 |
| 4,967,592 A | | 11/1990 | Lagergreen et al. | |
| 4,969,749 A | * | 11/1990 | Hasselmann | 374/115 |
| 5,086,403 A | | 2/1992 | Slocum et al. | |
| 5,156,042 A | | 10/1992 | Carlin et al. | |

(Continued)

FOREIGN PATENT DOCUMENTS

FR        2671202 A1  *  7/1992

(Continued)

*Primary Examiner*—Edward Lefkowitz
*Assistant Examiner*—Mirellys Jagan
(74) *Attorney, Agent, or Firm*—Buskop Law Group, PC; Wendy Buskop

(57) ABSTRACT

A detection apparatus for measuring fluid in a vessel, comprising: at least one processor for receiving, processing and storing data from sensors in the vessel, at least one vertical support disposed within the vessel and at least one pair of sensors connected to the at least one vertical support. The sensors continuously provide measurement data to the processor, wherein the processor synchronously polls measurement data from the sensors, continuously calculates values, and compares the calculated values to at least one predetermined range of values for the fluid in the vessel to identify whether the calculated values are within the predetermined values. The processor communicates the compared value to a data collector.

24 Claims, 2 Drawing Sheets

U.S. PATENT DOCUMENTS

| | | | | |
|---|---|---|---|---|
| 5,333,114 | A | * | 7/1994 | Warrior et al. ................. 700/67 |
| 5,351,725 | A | * | 10/1994 | Suthergreen et al. ........... 141/1 |
| 5,363,093 | A | * | 11/1994 | Williams et al. ............ 340/605 |
| 5,469,249 | A | | 11/1995 | Magyar, Jr. et al. |
| 5,706,857 | A | | 1/1998 | Dowling, Jr. et al. |
| 5,942,980 | A | | 8/1999 | Hoben et al. |
| 5,986,756 | A | | 11/1999 | Slater et al. |
| 6,401,045 | B1 | | 6/2002 | Rogers et al. |
| 6,446,027 | B1 | | 9/2002 | O'Keeffe et al. |
| 6,817,227 | B2 | | 11/2004 | Thompson et al. |
| 6,974,054 | B2 | | 12/2005 | Hutchinson |
| 2003/0219062 | A1 | * | 11/2003 | Egidio ........................ 374/170 |
| 2006/0142974 | A1 | * | 6/2006 | Scott et al. ................... 702/188 |
| 2006/0243347 | A1 | * | 11/2006 | Humphrey ................... 141/95 |

FOREIGN PATENT DOCUMENTS

| | | | |
|---|---|---|---|
| FR | 2743145 | A1 * | 7/1997 |
| JP | 59026025 | A * | 2/1984 |
| JP | 62261928 | A * | 11/1987 |

* cited by examiner

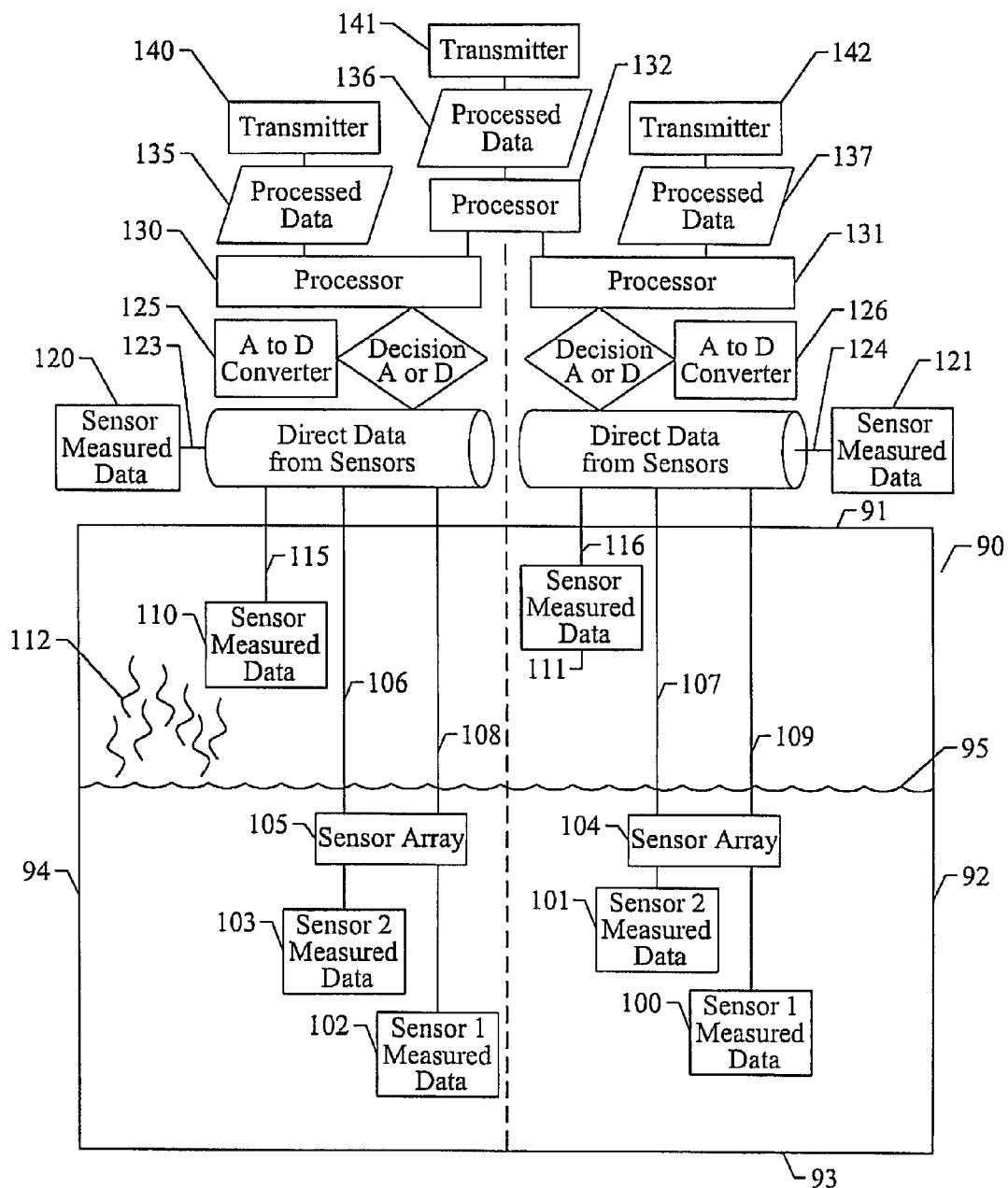

DETECTION APPARATUS FOR MEASURING FLUID IN A VESSEL

CROSS REFERENCE TO RELATED APPLICATIONS

This patent application is a continuation-in-part application that claims the benefit, under 35 USC § 120, of the prior co-pending non-provisional application Ser. No. 11/473,859 filed on Jun. 23, 2006. The prior co-pending non-provisional application is incorporated by reference along with its appendices.

FIELD

The present embodiments relate to a detection apparatus for measuring fluids in vessels.

BACKGROUND

Fluid containing vessels, such as large storage tanks are used to store hydrocarbon-based fuels and other products for future use. Often, these tanks are arranged close to one another to form tank farms. Probe assemblies and other detection and monitoring devices can be installed within or on tanks to monitor the amount of fluid in the tank, as well as the changes in conditions or state properties of the fluid, itself. However, many of the existing monitoring and detection devices are limited in their ability to compensate for changes in the storage tanks, such as bulging of the walls of the tank. In addition, many existing devices perform sequential measurements for monitoring state properties of the fluids, which can create problems regarding consistency and accuracy of measurements.

A need exists for a highly sensitive monitoring and detection apparatus that is easy to manufacture, easy to install, and incorporates the use of synchronized sensing devices for increased accuracy in measurements.

A need exists for a detection and monitoring apparatus that can attach to tanks, to a tanks roof and/or bottom or to sides of a vessel or tank, without being affected by the motion of a floating roof or a tank's walls and without the necessity of wall penetration.

A further need exists for a detection and monitoring apparatus that can attach as described and monitor emissions from tanks and vessels, comparing the measured emissions to requirements of environmental laws and regulations.

A need exists for a detection and monitoring apparatus with multiple sensors for performing hydrostatic tank measurements and hybrid method measurements, such as multiple temperature and multiple pressure measurements, in which sensors can perform synchronized measurements for increased accuracy and consistency with regard to measurement values.

The embodiments meet these needs.

BRIEF DESCRIPTION OF THE DRAWINGS

The detailed description will be better understood in conjunction with the accompanying drawing as follows:

FIG. 2 depicts a flow diagram of an embodiment of the invention.

Figure 1:
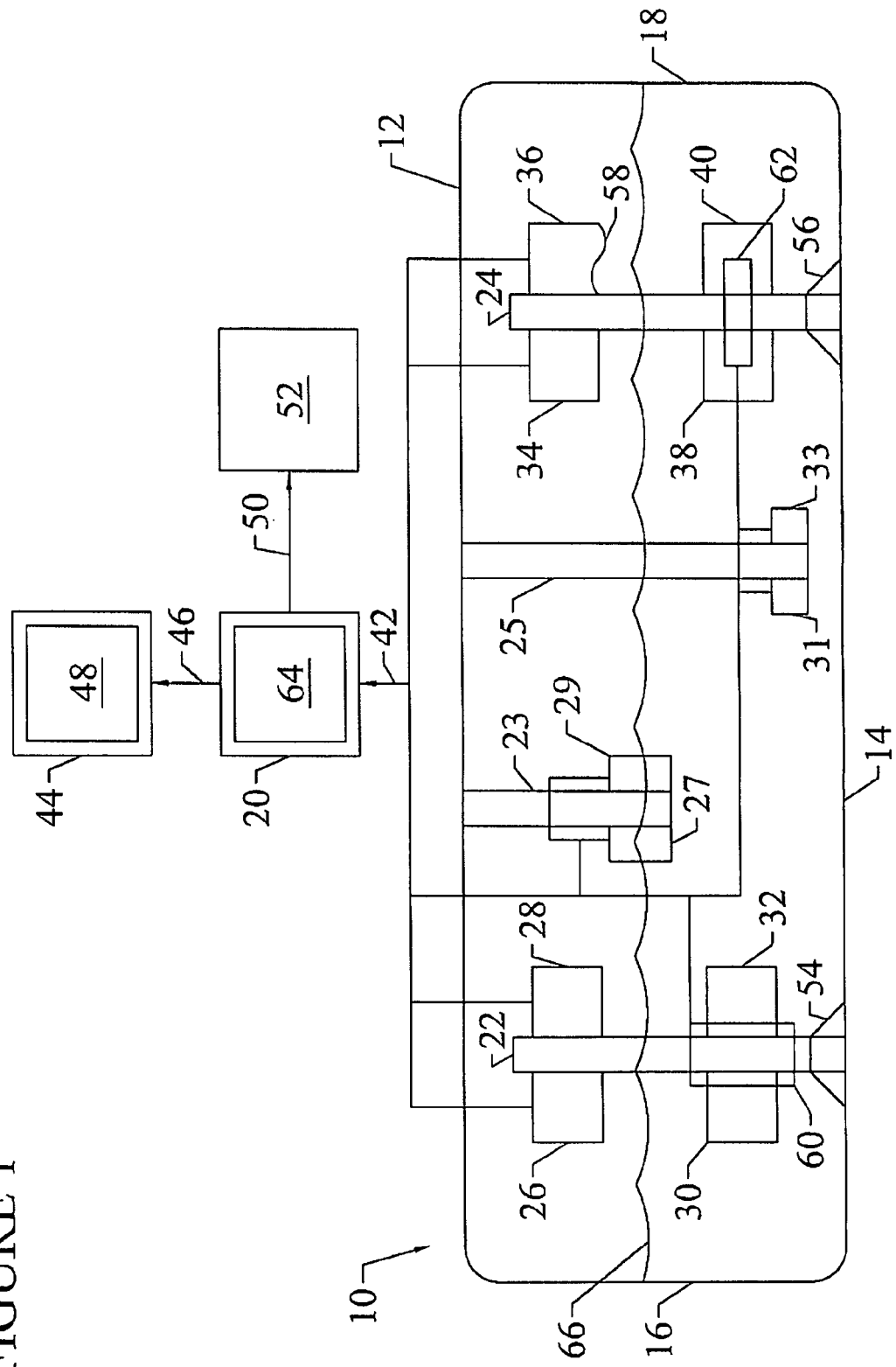
FIG. 1 depicts a diagram of the parts of an embodiment of the present detection apparatus.

The present embodiments are detailed below with reference to the listed figure.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a detection apparatus for measuring fluid in a vessel, such as a tank, a ship with a tank or hold, a truck which can contain fluids.

Vessel, as the term is used herein refers to the wide variety of tanks, and containers that can hold fluids.

Fluids, as the term is used herein include liquids, gasses, with or without particulate and combinations thereof. Vapor pressure is used in the conventional manner and is included within the scope of the term "gas" for this application.

The present detection apparatus advantageously provides enhanced accuracy and consistent measurements over existing detection and monitoring apparatuses.

The detection apparatus contemplates having one or more sensor arrays communicating with one or more processors to form a virtual tank for leak detection and other fluid measurement. The sensor arrays in essence create a virtual probe for leak detection.

Sensors, as the term is used herein refer to a pair of sensors that measure pressure and temperature of the fluid simultaneously. In an embodiment, it is contemplated that one of the pair of sensors can measure a multiple spot temperature of a fluid while another of the pair of sensors can measure vapor pressure in the vessel.

The sensors, to be effective as a pair, measure in combination, simultaneously at least pressure and temperature. These measurements include pressure of a fluid, temperature of a fluid, a multiple spot temperature of the fluid, a vapor or other gas pressure, a vapor or other gas temperature, an atmospheric pressure, and atmospheric temperature and combinations thereof.

"Vertical support means" or "support means" as the term is used herein refers to the support devices, such as wires, or flexible channel, or other rigid members that can hang down or rise up from the bottom of a vessel and support at least one pair of sensors having a temperature sensor and a pressure sensor.

Typical fluid measuring devices perform a series of sequential measurements, which allow for inconsistent and inaccurate values due to motion of the vessel and contained fluid, changes in the vessel over time, and changes in the state of the contained fluid. The present detection apparatus utilizes multiple sensors that continuously provide synchronized measurements. Use of synchronized sensors provides for simultaneous monitoring and measuring of fluid, in real-time, to provide a higher level of accuracy and consistency for fluid measurements and flow calculations than other detection devices.

The use of multiple synchronized sensors further advantageously allows hydrostatic tank measurements and hybrid method measurements to be performed, such as multiple temperature and pressure measurements, further providing increased accuracy.

The present detection apparatus can also beneficially allow the attachment of sensors to vertical supports in a vessel without requiring use of pipe and without requiring wall penetration. This method of attachment for the sensors occupies less space than other attachment methods, and allows for easier and faster installation at a lower cost. Furthermore, attachment without wall penetration can avoid the risks of hazardous environmental emissions and decreased vessel wall integrity.

The present detection apparatus additionally provides the benefit of continuous measurements, simultaneous with comparison of measured values with preset limits, such as environmental standards. The present device allows simultaneous detection of vapor pressure with liquid temperature, for example to create a virtual tank. A virtual tank, or a gauge used to determine a virtual tank is formed from data from a plurality of sensor arrays each having pairs of sensors to detect fluid temperature and pressure. These multiple sensor arrays may communicate with one or more processors in a vessel. The one or more processors in a single vessel then forms a more complete or more accurate representation of the vessel based upon the cumulative input of data form the more than one sensor array or more than one sensor array with multiple processors.

The versatility of the present invention relates to the many physical characteristics that can be measured using the sensors for the gas, liquid, with or without particulate matter.

Use of the present detection apparatus can thereby prevent hazardous environmental emissions, and avoid other potentially dangerous or detrimental fluid conditions through continuous monitoring. The comparison of measurements with preset limits can allow remediation to be taken when fluid conditions reach unacceptable levels, such as extreme pressures and temperatures, the formation of vacuums, and the emissions of harmful amounts of hydrocarbons and other potentially harmful chemicals, thereby preventing environmental contamination, explosion, loss of fluid, injury, death, damage to equipment, and other potential hazards or sources of loss. It should be noted that the remediation is not done with the gauge or virtual tank device, but with the information from the device.

The present detection apparatus is contemplated to include at least one processor, such as one made by Intel or Motorola, for receiving, processing, and storing data from sensors in a vessel, which can include tanks for containing oil, wine, or water. In a contemplated embodiment, from two to ten processors can be used.

The processor can be a lap top, a cell phone, a desk top computer, a server on a network, another measuring device that does different measuring that can connect to the sensors, or combinations of these items.

Vessels can include any type of tank or container, such as tanks, storage vessels, vats, container trucks, barrels, or other storage containers for containing fluid. For example, vessels can include a tank containing as little as ten barrels of oil or wine, or as much as 300,000 barrels. The vessels can be structures with or without floating roofs. The vessels can have any shape, including circular shapes, square shapes, or other similar shapes. Vessels of any volume made from various materials are also contemplated.

Measured fluids can include gasses, liquids, liquids having particulate matter, or combinations thereof, including hydrocarbon-based liquids and vapors. Other example of fluids that can be monitored and measured can include water, wine, beer, gasoline, oil, pharmaceuticals, other hydrocarbons, a benzene, other organic chemicals, alcohol, acid, esters, inert gases, and vapors thereof.

At least one support means is contemplated to be disposed within the vessel. The support means can be wires hanging down from the top of the vessel. The support means can be generally rigid support means extending from the top of the vessel downwardly toward the bottom. The generally rigid support means can be a rigid or somewhat rigid member, having some flexibility, extending from the bottom of the vessel upwardly.

A vessel can contain any number of supports means, and combinations of generally rigid support means with other types of support means, like the wires. The number of support means or generally rigid support means used or needed, will depend on the size of the vessel. For example, in a vessel that is fifty feet in diameter can include ten generally rigid vertical supports, with one generally rigid vertical support positioned every five feet. In another embodiment, the vessel may have one generally rigid support extending from the bottom of the vessel and several hanging from the top of the vessel. Between 1 and 100 support means can be used in the invention. Generally rigid can be a plastic material having some flexibility, or a steel channel.

Each support means can extend from the top of the vessel to the bottom in a straight line, or if it is a generally rigid support means, at a slight angle. In an alternate embodiment, one or more generally rigid vertical supports can extend from the bottom of the vessel upwardly toward the top, such as from 2 to 30 such supports, each supporting one or up to 48 sensors in arrays of 12 sensors.

In contemplated embodiments, the term support means refers to chains, solid rods, channels, such as angle irons or U channels, wires, woven cables, cables having magnetic foots, cables with one or more fasteners, such as clamps, or combinations thereof. The vertical supports can have various shapes, including a C-shape, a D-shape, a polygonal shape, a woven 8 pattern, or combinations of these and other similar shapes. The vertical supports can also be solid elongated bars.

One or more of the support means can be removably attached or secured to the top of the vessel, the bottom of the vessel, or combinations thereof although it is contemplated that only generally rigid supports are used on the bottom of the tank and the sides of the tank. In an embodiment, removable securing can include magnetically anchoring one or both ends of a vertical support to a portion of the vessel.

At least one pair of sensors, which can include sensors made by Keller-Druk, Wika, or Rosemont, or Honeywell is connected to at least one vertical support. The sensors are contemplated to provide continuous measurement data to the processor for real time detection of leaks or changes in fluid density. From one to forty-eight pairs of sensors can be used for measuring fluid in a vessel using the present detection apparatus. Continuous and simultaneous measurement is a feature of the invention for 24/7 monitoring of a vessel or tank, tank farm of many tanks, fleet of vessels—such as a fleet of tanker trucks being used for storage. This invention allows for monitoring to one site or many sites over the internet using communication with a network to a data collect, which can be server remote to the vessel on the Internet.

The sensors are contemplated to continuously measure one or more of the following: pressure of the fluid, temperature of the fluid, a multiple spot temperature of the fluid, and combinations thereof.

It is also contemplated that the sensors can measure vapor pressure, vapor temperature, atmospheric pressure, atmospheric temperature, and combinations thereof, as long as the pair of sensors measure temperature and pressure.

For example, a calculated value, such as a mass of a fluid can range from a few tons to hundreds of thousands of tons of crude oil in an oil tank farm. A calculated value, such as a fluid volume in a vessel can range from tens of barrels to millions of barrels of liquid petroleum gas. Fluid density can range from 0.5 grams/cc to 2 grams/cc or more for most petroleum products. Temperature of the fluid can range from −60 degrees Centigrade to 200 degrees Centigrade and can include vapor temperatures in addition to liquid temperature measurement. Impurity of the fluid can include a detection of water in oil on a percentage basis, such as a 5% impurity in West Texas crude oil.

In an embodiment, one or more of the sensors can include a diaphragm. The diaphragm can be oriented horizontal to the bottom of the vessel.

It is contemplated that one or more pairs of sensors can provide an analog signal to the processor. The analog signal can be digitized, such as by use of an analog-to-digital converter, and stored in fixed or removable data storage, transmitted to remote data storage or another processor, or combinations thereof.

Any number of sensors can communicate with a single processor. It is contemplated that a single processor can monitor sensors within multiple vessels simultaneously. It is further contemplated that any number of processors can be in communication with a single sensor for enabling management of a vessel from multiple locations. In this application, "simultaneously" means the sensors can collect measured data at the same time, or within a few milliseconds of each other, such as a period ranging from zero to one hundred milliseconds. An embodiment of the invention contemplates using sensors with built-in processors and direct digital communications to a data collector. That is, each pair of sensors can communicate with a processor on the array which then wirelessly communicates or makes a wired connection to a data collector. An embodiment of the invention contemplates that individual sensors have built in processors that communicate with another processor and then directly to the data collector which receives signals from a plurality of sensors in a single vessel. An embodiment of the invention contemplates that no analog to digital converter is used between the sensors and the one or more processors of a vessel. An embodiment of the invention contemplates that the data collector receives data from many vessels simultaneously to create virtual tanks using virtual gauges for comparative purposes for an entire tank farm or a fleet of vessels.

A particular example contemplates using pairs of sensors in a long row of sensors, each having a sequential number 1 to 10. In this embodiment, the pairs of sensors numbers 1,3,5, 7,9 would communicates with a processor "A" the pairs of sensors with numbers 2,4,6,8, and 10 would communicate with a processor "B". This alternating measurement using multiple processors continuously and synchronously provides for the extreme high accuracy of measurement with this device. By connecting processors together, their data can be compounded to create a virtual reading within one vessel. For example, 6 transmitter cards can be used having a total of 32 sensors and 2 processors to make a gauge that is highly accurate for the vessel.

Additionally processors can be of the type adapted to receive up to 12 analog readings from 1 or more sensors.

The synchronization of the sensors can be established using a clock or timed device with the processor or internal to the processor, to synchronize sensors, electronic switches and signals, analog-to-digital converters, and other equipment connected to the detection apparatus for increased accuracy. The data can be simultaneously compared in order to obtain a better real-time picture and to provide a higher accuracy of readings and measurements for the contained fluids. For example, fluid density can be particularly difficult to measure in a moving fluid without using synchronized data, since sequential measurements can be altered or can include errors due to the changes in the moving fluid or the vessel that occur between measurements.

The processor is contemplated to synchronously poll measurement data from the one or more pairs of sensors and continuously calculate values, forming calculated values. The processor can convert sensor data to one or more values using computer instructions with models and other computations stored in memory or associated data storage. The values provide a reading or notification of a measurement or calculation flow pertaining to the contained fluid for leak detection and related measurements. In this application, synchronously polling means that the processor polls the sensors within a predetermined time interval, such as a period ranging from zero to forty-five seconds.

The calculated values are compared to one or more predetermined ranges of values for the fluid to identify whether the calculated values are within the predetermined ranges. For example, a density of a specific crude oil could have a predetermined range from 0.85 to 1.0 grams/cc, and the present apparatus would constantly and synchronously collect data and compare the collected data to that predetermined range. It is contemplated that notification can be provided if the calculated values exceed a predetermined range. Use of automated responses, such as alarms, when the calculated values exceed a predetermined range is also contemplated.

The calculated values can include a mass of the fluid, a fluid volume, an average temperature of the fluid, a multiple density strata of the fluid, an average density of the fluid, a level of the fluid, a fluid flow rate, an impurity content of the fluid, an entrained water content of the fluid, a free water content of the fluid, or combinations thereof.

An embodiment of the detection apparatus monitors and compares measurements for atmospheric or ambient pressures and temperatures to measurements for vapor pressures and vapor temperatures to provide data simultaneously with notifications and/or alarms. Examples of these types of data include extreme pressures, extreme temperatures, the formation of vacuums, high amounts of hydrocarbon emissions or other harmful chemical emissions, or combinations thereof. Immediate notifications and alarms can be produced to provide an alert of potentially harmful gases, liquids, and vapors that are escaping into the atmosphere and surrounding area.

The processor is contemplated to communicate compared values to a data collector, which can include one or more data storage media in communication with the processor, including remote data storage media, removable data storage media, and fixed data storage media.

It is contemplated that the data collector can communicate with one or more of the following: (1) a remote terminal unit, such as a Bristol Babcock RTU for tubular line monitoring, (2) a distributive control system, such as, a Honeywell DSC 3000, (3) a supervised control and data acquisition (SCADA) system, such as a Human Machine Interface system, (4) another computer, (5) another a tank or vessel gauge interface unit, such as a 1515 ETGI provided by Gauging Systems, Inc., of Houston, Tex., and other similar devices.

It is further contemplated that the communication of compared values to the data collector can be performed using a field wiring bus, a network, or combinations thereof. Useable networks can include the internet, a local area network, a radio network, a hard wired network, a copper wire network, a cellular network, a satellite network, a fiber optic network, an infrared connection, a plain old telephone system (POTS), other wireless or wired networks, and combinations thereof.

In an embodiment, one or more pairs of sensors can include a transmitter, such as a radio transceiver, a satellite transmitter, a cellular transceiver, an RS-45 wired transmitter, or other similar transmitters disposed between the pair of sensors. The transmitter can communicate between the sensors and the processor. It is contemplated that this communication can be a wireless communication, such as an infrared, satellite, or cellular communication, a fiber optic communication, a cabled communication, or combinations thereof.

In another embodiment, one or more pairs of sensors can include a sensor processor, such as an Intel 8051 Processor, for communicating with the system processor.

It is further contemplated that a transmitter can be disposed in proximity to one or more vessels for transmitting data from the sensors within the one or more vessels to a remote processor.

The detection apparatus can include housing for containing sensors, which can be made from any durable material, including machined stainless steel, plastic, a metal alloy, such as Hastelloy-C, Teflon, aluminum, Kynar composites, ceramic composites, and formed polymer blends, such as PVC.

In an embodiment, the detection apparatus can include one or more channels within one or more vertical supports. The channels can contain signaling wires to convey sensor data to the processor. The channels can be smooth walled and can enable continuous communication of the sensors with the processor. The signaling wires can be multi-conductor wire, such as wire available from Belden, other types of wire, or similar communication wiring, such as fiber optic wiring or cable.

In one embodiment, the detection apparatus can be installed into or in proximity to a gauge well or gauge hatch of a large vessel, such as an oil tank, so that uncertainties caused by comparison with manual gauging due to reference point movement or bottom movement of the vessel are eliminated.

By locating the detection apparatus with the gauge well of the vessel, the detection apparatus can provide multiple measurements at one location and greatly increase the accuracy of a monitoring function. With this alignment, the detection apparatus can measure automatically all the values that are measured manually from the gauge well so that comparisons can be made of many variables at the same time the manual samplings by the gauge well are occurring. Examples of samplings and measurement values include: changes in a fluid level, temperatures of the fluid, fluid density, and a percentage of water content in a hydrocarbon fluid. Tank samplings and measured values include: level and temperature of the fluid and fluid density. The alignment of the detection apparatus with the gauge well of the vessel allows the measured values from the detection apparatus to be compared and calculated with the manual gauge well samplings and readings and dramatically improves the verification ability and consistency of the measurement values.

Referring now to FIG. 1, a diagram of the parts of an embodiment of the present detection apparatus is shown.

A vessel (10) is depicted having a top (12), a bottom (14), a first side (16), and a second side (18). While vessel (10) is depicted as a rounded container for storing fluids, such as hydrocarbon-based fluid, vessel (10) can be any type of vessel having any shape or dimensions, for holding any type of fluid, including round vessels and square vessels.

Vessel (10) is shown containing fluid (66), which is depicted occupying approximately one half the volume of vessel (10). It is contemplated that fluid (66) can produce vapor and exert a vapor pressure within portions of vessel (10) above the level of fluid (66).

Vessel (10) is shown having a first vertical support (22), a second vertical support (24), a third vertical support (23) and a fourth vertical support (25). This version of the gauge with four vertical supports is simply one embodiment of the support means for supporting the sensors. These vertical support means are not for holding up the vessel. In other embodiments, only 1 support means is needed and in other embodiments, 2 or more support means might be used, up to 10 support means or vertical support means depending on the size of the vessel.

Each vertical support extends from the top (12) of vessel (10) to the bottom (14) of vessel (10). While the vertical supports are depicted substantially perpendicular to both top (12) and bottom (14) the vertical supports can also attach or secure to top (12), bottom (14), or combinations thereof at an angle.

First vertical support (22) is depicted secured to bottom (14) by a first fastener (54), which can be one or more clamps, magnetic securing means, or other types of fasteners or securing devices. Second vertical support (24) is depicted secured to bottom (14) by a second fastener (56), which can be the same type of fastener as first fastener (54), or a different type of fastener. While first vertical support (22) and second vertical support (24) are shown secured to bottom (14) using fasteners, similar fastening means can also be used to secure first vertical support (22) and second vertical support (24) to top (12).

A first sensor (26) and a second sensor (28) are shown attached to first vertical support (22) at a level above that of fluid (66). First sensor (26) and second sensor (28) are shown transmitting measurement data (42) to a processor (20). Measurement data (42) can be transmitted using wireless means, or by using wiring that can extend through a channel within first vertical support (22).

A third sensor (30) and a fourth sensor (32) are shown attached to first vertical support (22) below the level of fluid (66). Third sensor (30) and fourth sensor (32) are shown having a transmitter (60), for communicating sensor measurements to processor (20). Transmitter (60) is shown transmitting measurement data (42) to processor (20).

A fifth sensor (34) and a sixth sensor (36) are shown attached to second vertical support (24) above the level of fluid (66). Sixth sensor (36) is shown having a diaphragm (58), oriented horizontal to bottom (14) of vessel (10). Both fifth sensor (34) and sixth sensor (36) are shown transmitting measurement data (42) to processor (20).

A seventh sensor (38) and an eighth sensor (40) are shown attached to second vertical support (24) below the level of fluid (66). Seventh sensor (38) and eighth sensor (40) are shown in communication with a sensor processor (62) for communicating sensor measurements to processor (20). Sensor processor (62) is shown transmitting measurement data (42) to processor (20). In a contemplated embodiment, sensor processor (62) can perform calculations on measurement data (42).

A ninth sensor (27) and a tenth sensor (29) are shown attached to third vertical support (23). An eleventh sensor (31) and a twelfth sensor (33) are shown attached to fourth vertical support (25). Ninth sensor (27), tenth sensor (29), eleventh sensor (31), and twelfth sensor (31) are shown transmitting measurement data (42) to processor (20).

It is contemplated that first sensor (26), second sensor (28), third sensor (30) via transmitter (60), fourth sensor (32) via transmitter (60), fifth sensor (34), sixth sensor (36), seventh sensor (38) via sensor processor (62), eighth sensor (40) via sensor processor (62), ninth sensor (27, tenth sensor (29), eleventh sensor (31), and twelfth sensor (33) are synchronized to transmit measurement data (42) from each sensor to processor (20) simultaneously, thereby providing consistent and accurate real-time measurements relating to fluid (66) and vapor within vessel (10).

In an embodiment, measurement data (42) can be transmitted from one or more of the sensors as an analog signal, which can be converted using an analog-to-digital converter (64), depicted in communication with processor (20). The processor (20) can communicate with a memory area (44). The memory can be any type of data storage, including remote data storage in communication with processor (20) via one or more networks, removable data storage, or fixed data storage. The analog to digital converter can be located within the processor but not necessarily in the memory area. The analog to digital converter can be tasked to convert analog signal into digital form before any kind of calculations are performed.

Processor (20) is contemplated to perform calculations on measurement data (42), which can be performed using computer instructions in memory area (44), forming calculated values (46). Calculated values (46) is compared to a predetermined range of values (48), depicted in memory area (44), forming a compared value (50). Compared value (50) is transmitted by processor (20) to a data collector (52).

FIG. 2 is a flow diagram for an embodiment of the invention. In particular, in a tank 90 having a first side 90, a top 91, a bottom 93 and a second side 94 contains liquid 96. Four sensors are depicted immersed in the liquid 94, namely sensors, 100,101,102,103. Two sensors together, one measuring pressure, one measuring pressure form a sensor array 104 and 105 respectively.

Power and signal wiring 106, 107,108, and 109 connect the respective sensors in the liquid to an analog to digital converter.

Additional sensors 110 111 are shown supported by power and signal wiring 115 and 116 are above the liquid level and are for measuring vapor 112. The wiring can be located in a support means that supplies structural support.

In this embodiment, only 1 vessel or tank is shown. However, multiple vessels could be used with 1 or 2 of the liquid sensors in each vessel.

Sensors and sensor arrays are supported by numerous forms of mounting structures in the one or more vessels to known vertical heights, which can range from a few inches from the bottom of the vessel to within an inch of the top of the vessel.

Above the vessel can be additional sensor pairs 120 and 121 that measure atmospheric pressures and temperatures. These sensors can connect using power and signal wiring 123 and 124 to an analog to digital converter, here shown as elements 125 and 126.

The analog to digital converters may or may not be used if the sensor data is already digital.

Digital data is transferred to one or more processors shown as 130, 131 and 132 in this FIG. 2. The processor can be located at the sensor, on top of the vessel, or remote to the vessel, or combinations of these.

The processor transmits processed data shown as elements 135, 136 and 137 to transmitters 140, 141 and 142 respectively.

Single sensors, redundant sensors or combined sensor array measurements of a vessel or multiple vessels can be performed simultaneously continuously and synchronously.

While these embodiments have been described with emphasis on the embodiments, it should be understood that within the scope of the appended claims, the embodiments light be practiced other than as specifically described herein.

What is claimed is:

1. A detection apparatus for measuring a fluid in a vessel having a top, a bottom, and at least one side, comprising:
   a. at least one support means disposed within the vessel extending from the top of the vessel downwardly toward the bottom;
   b. at least one pair of sensors supported by the at least one support means, wherein the at least one pair of sensors comprises: a first sensor for measuring pressure and a second sensor for measuring temperature, and wherein the at least one pair of sensors are connected to the at least one support means, wherein the at least one pair of sensors continuously measures for a member of the group consisting of:
      i. a pressure of a fluid;
      ii. a temperature of the fluid;
      iii. a multiple spot temperature of the fluid;
      iv. an atmospheric pressure; and
      vii. an atmospheric temperature; and combinations thereof,
   c. at least one processor for continuously and synchronously receiving, processing and storing data from the at least one pair of sensors using a clock or timed device, wherein the at least one processor:
      (i) continuously and synchronously polls measurement data from the at least one pair of sensors,
      (ii) continuously forms calculated values on mass of the fluid, volume of the fluid, multiple density strata of the fluid, density of the fluid, a level of the fluid, fluid flow rate, amounts of impurity in the fluid, an entrained water content in the fluid, a free water content in the fluid, or combinations thereof, and
      (iii) continuously compares the calculated values to at least one predetermined range of values for the fluid in the vessel to identify if the calculated values are within the at least one predetermined range of values, forming a compared value; and
      (iv) communicates the compared value to a data collector.

2. The apparatus of claim 1, wherein the at least one support means comprises wires hanging from a top of the vessel downwardly into the vessel.

3. The apparatus of claim 1, wherein the at least one support means is flexible and foldable.

4. The apparatus of claim 1, further comprising a transmitter disposed between the at least one pair of sensors and the at least one processor for communicating between the at least one pair of sensors and the at least one processor.

5. The apparatus of claim 1, wherein each pair of sensors comprises at least one processor and pairs of sensors are connected in series to a second processor for forming a virtual tank.

6. The apparatus of claim 1, wherein in the vessel, a first set of pairs of sensors connected in series alternate with a second set of pairs of sensors connected in series, and the first set of pairs of sensors communicate with a first processor and the second set of pairs of sensors communicate with a second processor for highly accurate monitoring of the vessel by comparing data formed by the first processor with data formed by the second processor.

7. The apparatus of claim 1, wherein in the vessel, first pairs of temperature and pressure sensors alternate individually with second pairs of temperature and pressure sensors, and the first pairs of temperature and pressure sensors communicate with a first processor and the second pairs of temperature and pressure sensors communicate with a second processor to form a vessel gauge.

8. The apparatus of claim 1, wherein the at least one pair of sensors further comprises a sensor processor to communicate with the at least one processor.

9. The apparatus of claim 1, wherein the at least one support means is removably attached to the top of the vessel.

10. The apparatus of claim 1, wherein the communicating of the compared values from at least one processor to the data collector is by a member of the group consisting of: a field wiring bus, a network, or combinations thereof.

11. The apparatus of claim 1, wherein from two processors to ten processors are used for forming calculated values relative to fluid in the vessel.

12. The apparatus of claim 1, wherein multiple processors can be used each addressing separate pairs of sensors, and wherein the multiple processors can be combined to create a virtual reading with the vessel.

13. The apparatus of claim 1, wherein between one pair of sensors and forty-eight pairs of sensors are used for forming calculated values relative to fluid in the vessel.

14. The apparatus of claim 1, wherein the fluid is a gas, a liquid, a liquid with particulate matter, a vapor, or combinations thereof.

15. The apparatus of claim 1, wherein at least one of the at least one pair of sensors provides an analog signal to at least one processor.

16. The apparatus of claim 1, wherein at least one sensor from the pair of sensors has a diaphragm.

17. The apparatus of claim 16, wherein the diaphragm is oriented horizontal to the bottom of the vessel.

18. The apparatus of claim 1, wherein the at least one support means comprises at least one generally rigid support extending downwardly from the top of the vessel to the bottom of the vessel.

19. The apparatus of claim 18, wherein the at least one generally rigid support is a member of the group consisting of: a chain, a solid rod, a channel, a wire, a woven cable, a cable with a magnetic foot, a cable with a fastener, or combinations thereof.

20. The apparatus of claim 18, wherein the at least one generally rigid support has a shape selected from the group consisting of: a C-shape, a D-shape, a polygonal shape, a solid elongated bar, a woven 8 pattern, or combinations thereof.

21. The apparatus of claim 18, wherein the at least one generally rigid support is removably secured to the bottom of the vessel.

22. The apparatus of claim 18, wherein the at least one generally rigid support is magnetically anchored to the bottom of the vessel.

23. The apparatus of claim 18, wherein the at least one generally rigid support comprises a channel for supporting wires from at least one processor to at least one pair of sensors.

24. A detection apparatus for measuring fluid in a vessel having a top, a bottom, and at least one side comprising:
   a. at least one processor for continuously and synchronously receiving, processing and storing data from sensors in the vessel;
   b. a transmitter disposed in proximity to the vessel, wherein the transmitter is in communication with the at least one processor;
   c. at least one support means disposed within the vessel;
   d. at least one pair of sensors supported by the at least one support means, and connected to the at least one support means, wherein the at least one pair of sensors is in communication with the transmitter and the pair of sensors is adapted to continuously and synchronously send signals to the transmitter, for synchronously measuring a member of the group consisting of:
      i. a pressure of a fluid;
      ii. a temperature of the fluid;
      iv. a multiple spot temperature of the fluid;
      v. an atmospheric pressure; and
      viii. an atmospheric temperature; and combinations thereof,
   e. wherein the at least one processor using a clock or timed device continuously and synchronously polls measurement data from the transmitter, continuously calculates values forming calculated values, and compares the calculated values to at least one predetermined range of values for the fluid in the vessel to identify if the calculated values are within the at least one predetermined range of values, forming a compared value, and wherein the calculated values comprise a mass of the fluid, a fluid volume, an average temperature of the fluid, a multiple density strata of the fluid, an average density of the fluid, a level of the fluid, a fluid flow rate, an impurity content of the fluid, an entrained water content of the fluid, a free water content of the fluid, or combinations thereof, and wherein the at least one processor communicates the compared value to a data collector.

* * * * *